April 17, 1951     M. D. FISKE     2,549,443
ULTRA HIGH FREQUENCY COUPLING AND MEASURING DEVICE
Filed Jan. 21, 1949
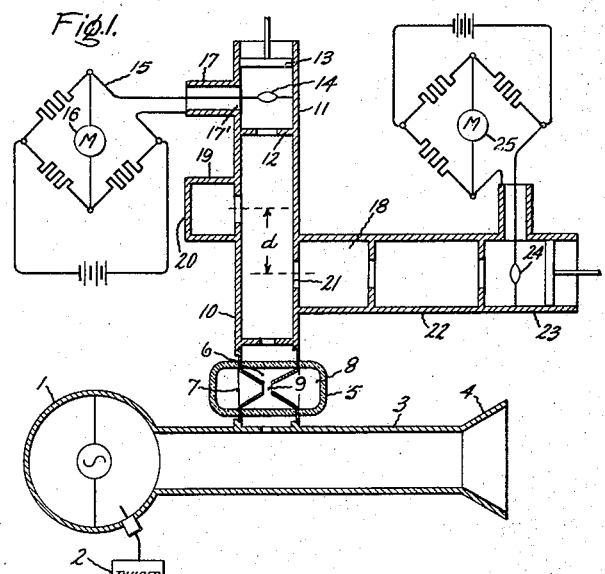
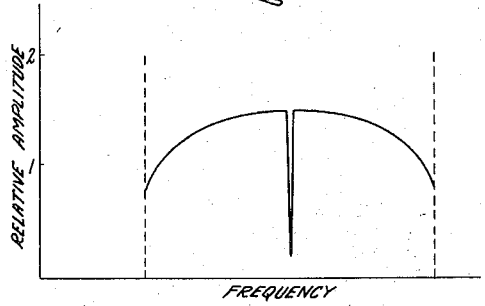
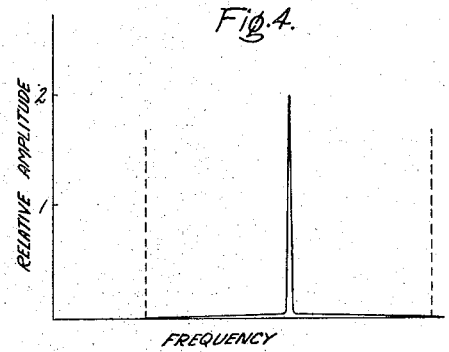
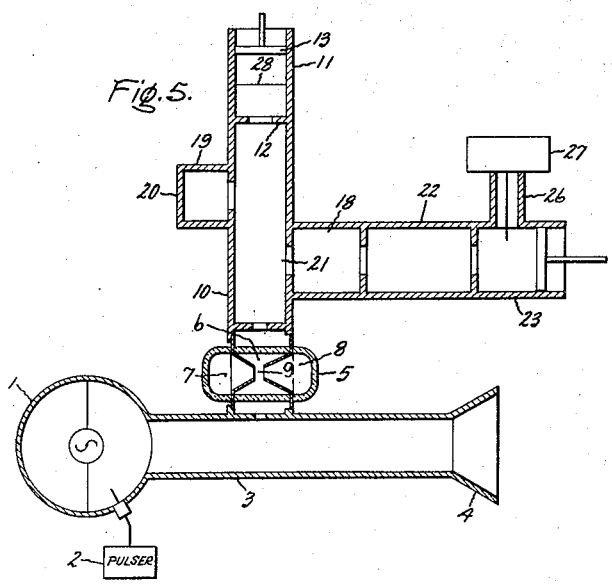
Inventor:
Milan D. Fiske,
by Richard E. Hosley
His Attorney.

Patented Apr. 17, 1951

2,549,443

UNITED STATES PATENT OFFICE 2,549,443

ULTRA HIGH FREQUENCY COUPLING AND MEASURING DEVICE

Milan D. Fiske, Burnt Hills, N. Y., assignor to General Electric Company, a corporation of New York Application January 21, 1949, Serial No. 71,906

3 Claims. (Cl. 178—44)

My invention relates to coupling and measuring apparatus for ultra high frequency radio systems and more particularly to apparatus for separating, measuring and coupling the component frequencies of an ultra high frequency electromagnetic wave or pulse.

In ultra high frequency systems which employ transmitting apparatus and receiving apparatus connected to the same antenna system, receiver protecting devices known as transmit-receive devices are often used to prevent the intense oscillations generated by the transmitter from damaging the delicate receiver apparatus. These transmit-receive devices are connected across the receiving line and commonly comprise a gas filled electron discharge device which is fired by the transmitted signal. When fired, this device functions as a low impedance path across the receiving line to prevent the transmitting signal from entering thereinto. If the transmit-receive device should fail to operate properly, as for example, if it should not fire quickly enough, the energy escaping through the device may cause considerable damage to the delicate and expensive receiver equipment. It is one of the objects of my invention, therefore, to provide a new and improved device for measuring the energy escaping through transmit-receive devices under operating conditions.

Where the ultra high frequency oscillations produced by the transmitter occur in short pulses, as in radio detection systems, a small pulse of energy commonly known as a "spike" escapes through the transmit-receive device before it is fired. This transient pulse is followed by a post-firing power leakage, more or less uniform with time, known as the "flat." Since it is the energy within the spike alone which usually does the actual damage to the receiver rather than the entire energy leaking through the transmit-receive device, it is another object of my invention to provide a device which separates the energy of the spike from the flat power leakage.

A further object is to provide a measuring device which continuously indicates the energy within this spike.

A further specific object of my invention is to provide a measuring device which continuously indicates the average power leakage of the "flat."

An additional object is to provide a coupling device from a transmit-receive device to a receiver which filters the spike energy from the leakage through the transmit-receive device and permits only the flat power to reach the receiver.

The frequency spectrum of this spike contains the transmitted frequency and side frequencies of lower amplitude running several hundred megacycles wide depending upon the duration of the spike. It is often desirable to separate the transmitted frequency from these side frequencies, and it is another object of my invention to provide a device which effectively accomplishes this separation.

Briefly stated, my invention comprises a wave guide coupled to the output of a transmit-receive device and terminating in a radio frequency absorptive element which is suitably connected to an instrument for indicating electrical energy absorbed by the element. A first cavity resonator tuned to the transmitted frequency is coupled to the wave guide a specific wave length beyond a second similarly tuned cavity resonator leading from the wave guide to an auxiliary wave guide. This auxiliary wave guide is either terminated for measurement purposes in a matched radio frequency absorptive element which is suitably connected to a second indicating instrument, or it is coupled to a receiver or other unit of the radio system.

The novel features which I believe to be characteristic of my invention are set forth with particularity in the appended claims. My invention itself, however, together with further objects and advantages may best be understood by reference to the following description taken in connection with the accompanying drawing in which Fig. 1 is a diagrammatic view of one embodiment of my invention illustrating its use as a measuring device, Fig. 2, Fig. 3 and Fig. 4 are curves explanatory of the operation of my invention, and Fig. 5 is a diagrammatic view of a modification of my invention illustrating its use as a coupling device.

Referring to Fig. 1, I have shown my invention in one form as applied to an ultra high frequency transmitting system comprising an ultra high frequency oscillator 1, modulated by a conventional pulse generator 2, and transmitting pulses of high frequency energy through a dielectric wave guide 3 to be radiated by an antenna 4. A conventional transmit-receive device 5, comprising gas switching tube 6 which has a pair of opposed cone-shaped electrodes 7 and 8 whose apices are separated by a small discharge gap 9, is coupled to the wave guide 3.

In actual operation, transmit-receive device 5 is usually coupled to a radio receiver (not shown in Fig. 1) and functions to prevent the intense oscillations of the transmitted pulse from damaging the receiving equipment. The intense electro-magnetic field associated with the transmitted pulse as it travels down wave guide 3 ionizes the gas within tube 6 and causes the gap 9 to break down, thereby establishing a conductive path between electrodes 7 and 8 and effectively short-circuiting the entrance to the receiving equipment. However, as illustrated in Fig. 2, in the small instant of time before tube 6 fires, a small pulse or spike of energy passes through the transmit-receive device 5. After the transmit-receive device fires, a small amount of power leakage called the "flat" power continues to pass through the device for the duration of the pulse. The power within this "flat" is obviously the result of energy at the frequency of the transmitted wave alone.

It is the energy within the spike, however, rather than the energy of the entire leakage through the transmit-receive device, which causes damage to crystals and other delicate receiving equipment. It is, therefore, necessary to separate the spike energy from the flat power, in order to measure the spike energy alone if the protection given by a particular transmit-receive device is to be accurately tested.

In order to accomplish this separation and measurement of the energy of this spike as well as to separate the transmitted frequency from all other frequencies within this spike, I provide a new and improved measuring device which is coupled to the transmit-receive device 5 in place of the usual receiving equipment. A portion of a dielectric wave guide 10, preferably rectangular, having dimensions permitting propagation of a wave whose frequency is equal to that of the transmitted wave as well as a fairly wide band of side frequencies without appreciable attenuation is coupled to the output of device 5 in any suitable manner such as illustrated in Fig. 1. It is to be understood, of course, that although I have shown my invention as, preferably, applying to a rectangular wave guide, other configurations such as a cylindrical wave guide may be used instead.

Wave guide 10 is terminated in a terminating means 11 having a value of impedance equal to the characteristic impedance of guide 10 and which, in one form as illustrated, comprises an iris 12, an adjustable end plate 13 and an absorptive element 14 inserted diametrically across the wave guide termination 11.

In order to measure the power of the ultra high frequency wave arriving at this termination, many different types of absorptive elements and methods of coupling to an indicating instrument may obviously be used. For simplicity and accuracy, I prefer to use a resistive element having a high negative temperature coefficient such as described and claimed in U. S. Patent 2,274,592 issued to E. F. Dearborn, June 23, 1939, and commonly known as a thermistor. This thermistor is connected as one element of a conventional Wheatstone bridge 15 which is balanced in the absence of radio frequency power. As the thermistor absorbs radio frequency energy, its temperature increases causing a corresponding decrease in its resistivity and thereby deflecting the indicating instrument 16 in the Wheatstone bridge 15. Deflection of instrument 16 can be related directly to the absorbed energy once the absolute sensitivity of the bridge is determined. The thermistor 14 is coupled to the bridge 15 through an open ended quarter wave section 17 which functions as a choke to establish a low impedance or short-circuit across its entrance 17' thus preventing the radiation of radio frequency energy through the coupling.

In order to separate the energy of the transmitted frequency, in other words, the flat power, from the energy caused by the component frequencies of the spike, I provide a pair of cavity resonators 18 and 19 coupled to guide 10 and separated along its longitudinal axis by a distance $d$, approximately equal to a quarter wave length or odd multiple thereof at the frequency of the transmitted energy. Both resonators have a length approximately equal to a quarter wave guide of the transmitter frequency and are tunable to the transmitter frequency by any suitable conventional means (not shown). Resonator 19 is short-circuited at its end remote from wave guide 10 by a transverse wall 20. The short circuit constituted by wall 20, since it is located a half wave length away from the point of connection 21 of resonator 18 across wave guide 10, appears as an electrical short circuit across wave guide 10 at this point 21 for electromagnetic waves of the transmitted frequency. This directs substantially all energy of waves of the transmitted frequency into cavity resonator 18 and prevents these waves from passing down wave guide 10 to its matched impedance termination 11. Waves of all other frequencies representing the energy within the spike are not rejected by cavity resonator 19 and pass through to this termination 11.

The cavity resonator 18 is coupled to an auxiliary wave guide 22 leading to a matched thermistor termination 23 similar in all respects to matched impedance termination 11. Since resonator 18 is tuned to the transmitted frequency, it acts as a series resonant circuit to provide an acceptance path from wave guide 10 into wave guide 22 for waves of this frequency, but rejects substantially all waves of other frequencies from wave guide 22. Therefore, the radio frequency energy reaching a thermistor 24 in termination 23 consists solely of waves of the transmitted frequency and represents the "flat" power.

The accuracy of the above-described separation of frequencies depends, of course, to a large extent upon the selectivity of the cavity resonators. For optimum readings, the band width of these cavities should be wide enough to pass only the energy of the transmitted frequency. A cavity Q of approximately 1000 is appropriate for X-band frequencies.

The frequency spectrum of the energy reaching thermistor termination 11 is diagrammatically illustrated in Fig. 3 by a chart in which frequency is plotted against amplitude. As can be seen by Fig. 3, the waves of the transmitted frequency represented by the dip in the curve are filtered out of the spectrum and meter 16 indicates only the energy of all other frequencies and is substantially equivalent to the "spike" energy. Fig. 4 is a similar chart of the energy reaching thermistor 24 and consists solely of the waves of the transmitted frequency. A meter 25 indicates this flat power alone.

A power loss through cavity resonator 18 of approximately 1.5 decibels for a Q of 1000 must, of course, be taken into consideration in properly determining this flat power. Considerable care also must be taken properly to tune both resonators to the transmitted frequency, otherwise a portion of the power of waves of the transmitted frequency may pass through the filtering arrangement to reach termination 11 and be interpreted as spike energy.

Referring now to Fig. 5, I have shown a modification of my invention whereby it is used as a protective coupling device to a receiver. The device illustrated in Fig. 5 is substantially similar to that of Fig. 1 with the exception that the output of auxiliary wave guide 22 is coupled by such means as concentric transmission line 26 to a receiver shown as block 27 rather than to a measuring bridge. The output of wave guide 19 may either be coupled to a measuring instrument as illustrated in Fig. 1 to enable a continuous reading of the spike energy or it may be absorbed by a dummy load such as a thin resistance film 28, diametrically inserted across termination 11 as illustrated in Fig. 5.

Since only the "flat" power reaches the termination of auxiliary guide 22 the danger of damage to crystals or other delicate receiving equipment due to the spike energy is eliminated.

While I have shown a particular embodiment of my invention, it is to be understood that I do not wish to be limited thereto since many modifications may be made and, I therefore, contemplate, by the appended claims, to cover any such modifications as fall within the true spirit and scope of my invention.

What I claim as new and desire to secure by Letters Patent of the United States is:

1. In an antenna system for transmitting pulses of electromagnetic energy of an ultra high frequency, a wave guide having a high frequency energy absorptive termination, a transmit-receive device connected between said antenna system and said wave guide, said transmit-receive device being responsive to any one pulse of transmitted energy to permit the passage into said wave guide of an initial spike of multi-frequency energy followed, for the remainder of said one pulse, by flat energy of greatly reduced amplitude at said frequency of transmission, a pair of cavity resonators tuned to said frequency of transmission and coupled to said wave guide at points separated along the longitudinal axis of said guide by a distance substantially equal to an odd multiple of a one-quarter wave length at said frequency of transmission, whereby said spike energy is directed to said energy absorptive termination of said wave guide and said flat energy is directed into the one of said resonators located more adjacent said transmit receive device, and high frequency energy receiving means coupled to said last-mentioned one of said resonators to receive only that portion of the energy passing through said transmit receive device which is propagated at said frequency of transmission.

2. In an antenna system for transmitting pulses of electromagnetic energy of an ultra high frequency, a wave guide having a first high frequency energy absorptive means, a transmit-receive device connected between said antenna system and said wave guide, said transmit-receive device being responsive to any one pulse of transmitted energy to permit the passage into said wave guide of an initial spike of multi-frequency energy followed, for the remainder of said one pulse, by flat energy of greatly reduced amplitude at said frequency of transmission, a pair of cavity resonators tuned to said frequency of transmission and coupled to said wave guide at points separated along the longitudinal axis of said guide by a distance substantially equal to an odd multiple of a one-quarter wave length at said frequency of transmission whereby said spike energy is directed to said energy absorptive means of said wave guide and said flat energy is directed into the one of said resonators located more adjacent said transmit-receive device, a second high frequency energy absorptive means coupled to said last mentioned one of said resonators to absorb said flat energy, and means to measure the energy absorbed by at least one of said energy absorptive means.

3. In an antenna system for transmitting pulses of electromagnetic energy of an ultra high frequency, a wave guide, a transmit-receive device connected between said antenna system and said wave guide, said transmit-receive device being responsive to any one pulse of transmitted energy to permit the passage into said wave guide of an initial spike of multi-frequency energy followed for the remainder of said one pulse by energy of greatly reduced amplitude at said frequency of transmission, a pair of cavity resonators tuned to said frequency of transmission and coupled to said wave guide at points separated along the longitudinal axis of said guide by a distance substantially equal to an odd multiple of one-quarter wave length at said frequency of transmission whereby energy passing through said transmit-receive device at said frequency of transmission is directed into the one of said resonators located more adjacent said transmit-receive device, the energy of all other frequency components in said spike passing down said wave guide beyond said resonators, and means coupled to said wave guide at a point beyond said resonators for measuring the energy of frequency components in said spike other than said frequency of transmission.

MILAN D. FISKE.

REFERENCES CITED

The following references are of record in the file of this patent:

UNITED STATES PATENTS

| Number | Name | Date |
|---|---|---|
| 2,478,332 | Smullin | Aug. 9, 1949 |